US012626385B2

(12) United States Patent
Tsukahara

(10) Patent No.: US 12,626,385 B2
(45) Date of Patent: May 12, 2026

(54) APPARATUS, METHOD, AND STORAGE MEDIUM

(71) Applicant: CANON KABUSHIKI KAISHA, Tokyo (JP)

(72) Inventor: Azusa Tsukahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 18/186,866

(22) Filed: Mar. 20, 2023

(65) Prior Publication Data

US 2023/0306623 A1     Sep. 28, 2023

(30) Foreign Application Priority Data

Mar. 28, 2022     (JP) ................................. 2022-052634

(51) Int. Cl.
*G06T 7/593* (2017.01)
*G06T 7/32* (2017.01)

(52) U.S. Cl.
CPC ............... *G06T 7/593* (2017.01); *G06T 7/32* (2017.01)

(58) Field of Classification Search
CPC . G06T 7/593; G06T 7/32; G06T 2207/10024; G06T 7/97; H04N 2013/0081; H04N 13/25
See application file for complete search history.

(56) References Cited

U.S. PATENT DOCUMENTS

| | | | | |
|---|---|---|---|---|
| 8,619,082 B1 * | 12/2013 | Ciurea | ................... | H04N 23/16 |
| | | | | 382/154 |
| 2015/0071498 A1 * | 3/2015 | Nishimura | .............. | G06T 7/285 |
| | | | | 382/107 |

FOREIGN PATENT DOCUMENTS

| | | | | | |
|---|---|---|---|---|---|
| JP | 2008242839 | A | * | 10/2008 | |
| JP | 2013019801 | A | * | 1/2013 | |
| JP | 2020112881 | A | | 7/2020 | |
| KR | 100993305 | B1 | * | 11/2010 | ............. H04B 17/30 |

* cited by examiner

*Primary Examiner* — Oneal R Mistry
*Assistant Examiner* — Justin Philip Cascais
(74) *Attorney, Agent, or Firm* — Canon U.S.A., Inc. IP Division

(57)     ABSTRACT

An apparatus for calculating a parallax based on a first image and a second image calculates a cross-correlation value between a first criterion image set on the first image and a first reference image set on the second image, calculates an auto-correlation value between a second criterion image and a second reference image set on either one of the first image and the second image, calculates a parallax amount between the first image and the second image by using the cross-correlation value and the auto-correlation value, and corrects the cross-correlation value by using the auto-correlation value.

20 Claims, 9 Drawing Sheets

FIG.1A

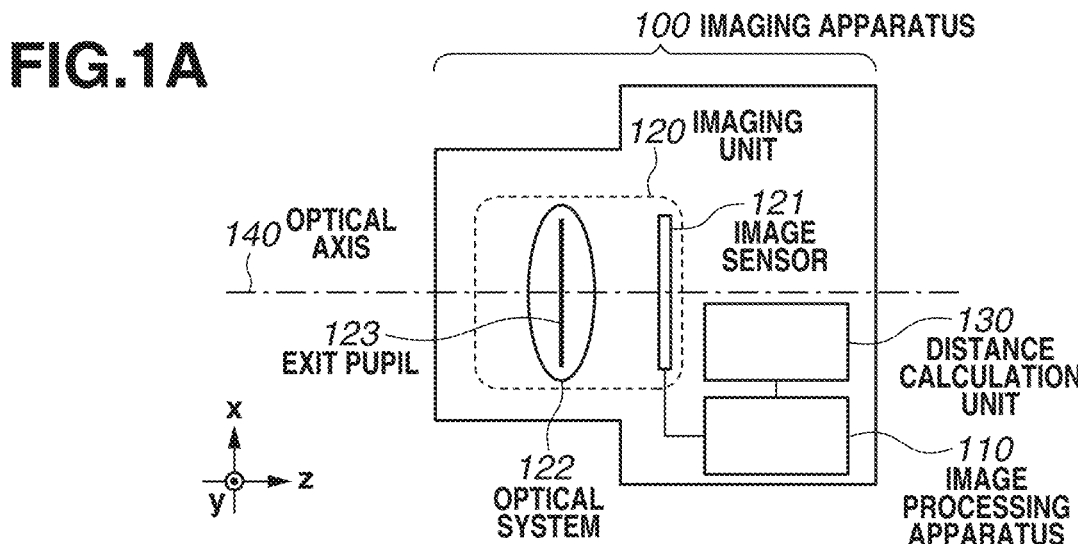

*100* IMAGING APPARATUS

*120* IMAGING UNIT

*121* IMAGE SENSOR

*140* OPTICAL AXIS

*123* EXIT PUPIL

*130* DISTANCE CALCULATION UNIT

*110* IMAGE PROCESSING APPARATUS

*122* OPTICAL SYSTEM

FIG.1B

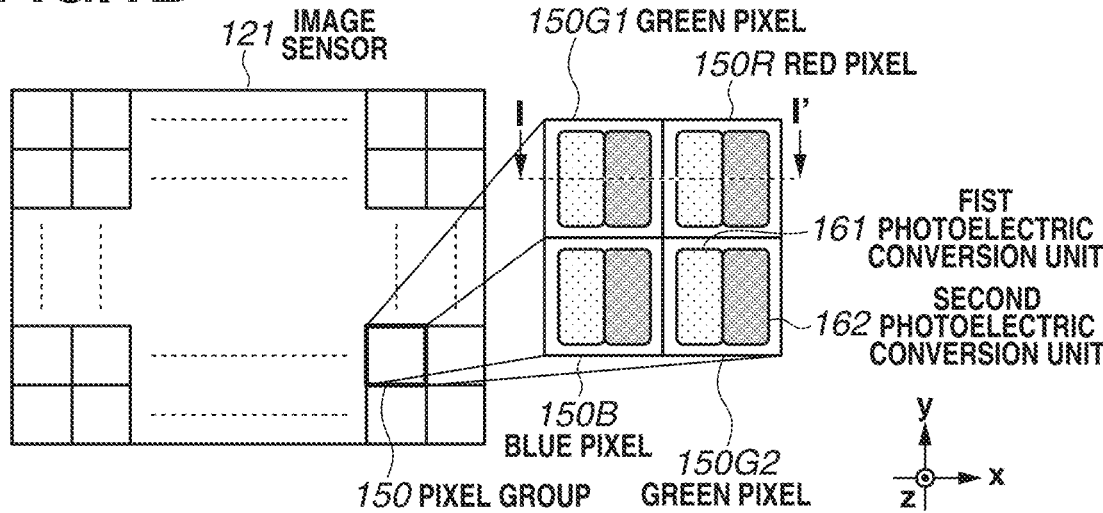

*121* IMAGE SENSOR

*150G1* GREEN PIXEL

*150R* RED PIXEL

*161* FIST PHOTOELECTRIC CONVERSION UNIT

*162* SECOND PHOTOELECTRIC CONVERSION UNIT

*150B* BLUE PIXEL

*150G2* GREEN PIXEL

*150* PIXEL GROUP

FIG.1C

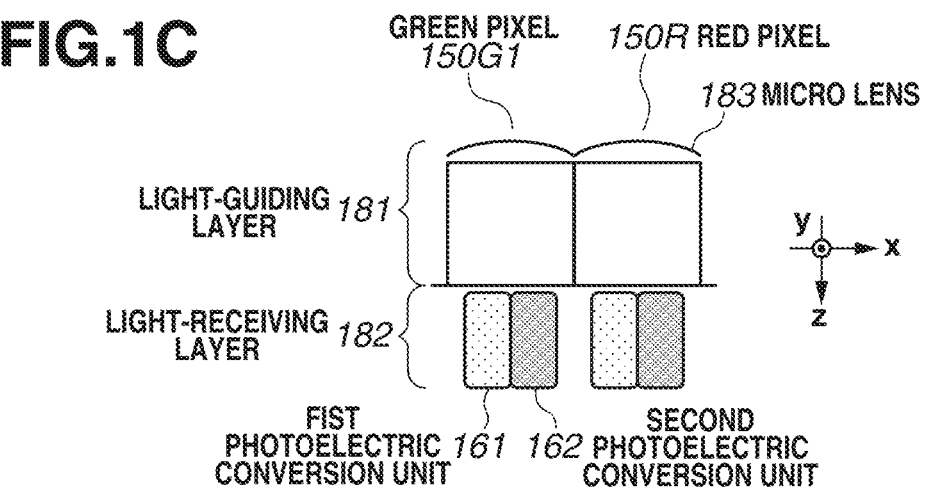

GREEN PIXEL *150G1*

*150R* RED PIXEL

*183* MICRO LENS

LIGHT-GUIDING LAYER *181*

LIGHT-RECEIVING LAYER *182*

FIST PHOTOELECTRIC CONVERSION UNIT *161*

*162* SECOND PHOTOELECTRIC CONVERSION UNIT

*110*

FIG.4A
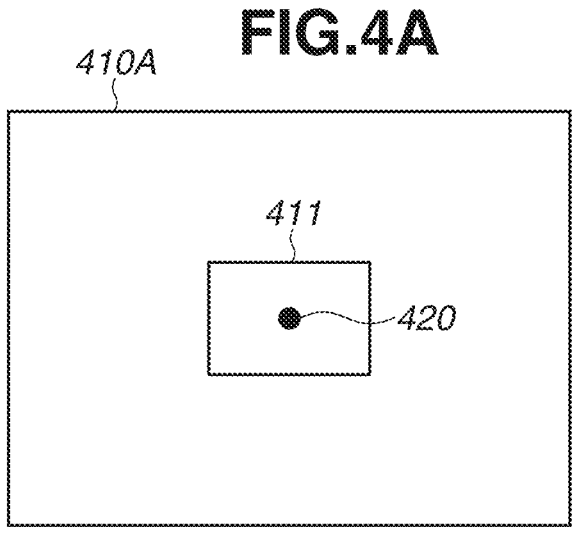
_410A_
_411_
_420_
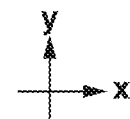
FIG.4B
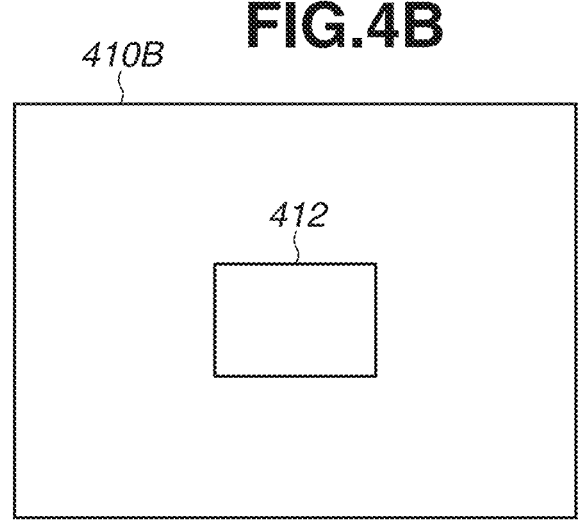
_410B_
_412_
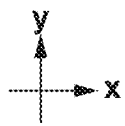
FIG.4C
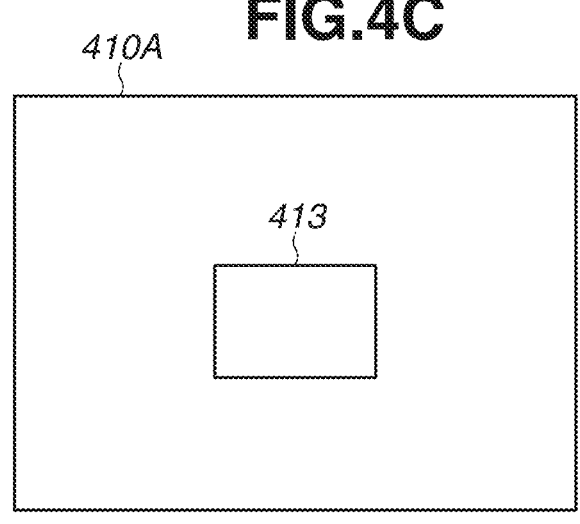
_410A_
_413_
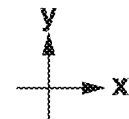

FIG.5A
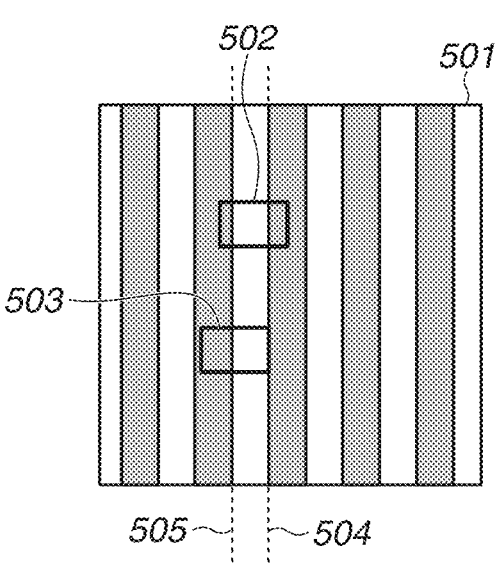
FIG.5B
AUTO-CORRELATION VALUE
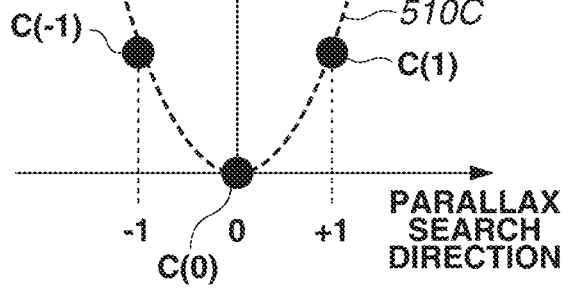
FIG.5D
CROSS-CORRELATION VALUE
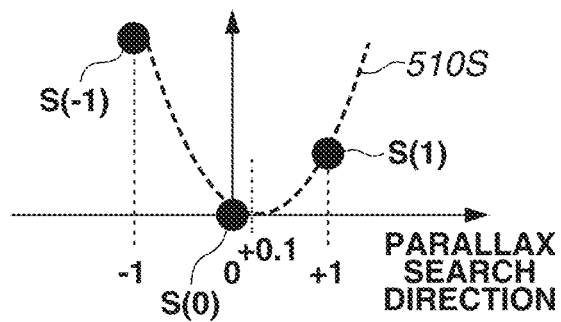
FIG.5C
AUTO-CORRELATION VALUE
FIG.5E
CROSS-CORRELATION VALUE
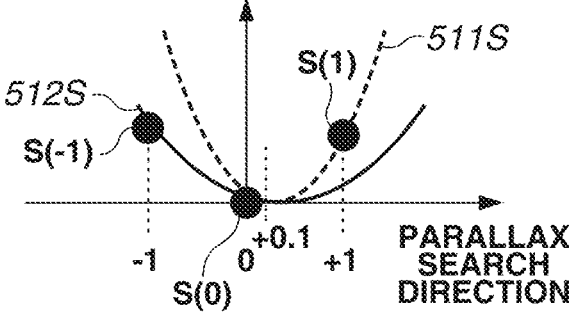

701

IMAGE PROCESSING APPARATUS

111

CROSS-CORRELATION
CALCULATION UNIT

112

AUTO-CORRELATION
CALCULATION UNIT

PARALLAX
CALCULATION UNIT ~710

START

IMAGE ACQUISITION —S310

CROSS-CORRELATION
CALCULATION PROCESSING —S311

AUTO-CORRELATION
CALCULATION PROCESSING —S312

PARALLAX CALCULATION
PROCESSING —S710

END

*801*

APPARATUS, METHOD, AND STORAGE MEDIUM

BACKGROUND

Technical Field

The aspect of the embodiments relates to an image processing apparatus for calculating a parallax based on a plurality of images.

Description of the Related Art

There are techniques for calculating three-dimensional information based on a plurality of images. Examples of techniques for calculating three-dimensional information include a sub pixel estimation method. This method calculates a sub pixel parallax by fitting a predetermined function corresponding to a cross-correlation value calculation method with respect to cross-correlation having the lowest dissimilarity and the neighbor cross-correlation values.

Japanese Patent Application Laid-Open No. 2020-112881 discusses a technique for estimating a sub pixel parallax through cross-correlation and then correcting an error due to an abrupt pixel value change of a captured image by using auto-correlation.

However, in particular, the technique discussed in Japanese Patent Application Laid-Open No. 2020-112881 may be unable to accurately correct an error due to the asymmetry of an edge texture.

SUMMARY

According to an aspect of the embodiments, an apparatus for calculating a parallax based on a first image and a second image calculates a cross-correlation value between a first criterion image set on the first image and a first reference image set on the second image, calculates an auto-correlation value between a second criterion image and a second reference image set on either one of the first image and the second image, calculates a parallax amount between the first image and the second image by using the cross-correlation value and the auto-correlation value, and corrects the cross-correlation value by using the auto-correlation value.

Further features of the disclosure will become apparent from the following description of exemplary embodiments with reference to the attached drawings.

BRIEF DESCRIPTION OF THE DRAWINGS

FIGS. 1A to 1C illustrate an imaging apparatus having an image processing apparatus according to a first exemplary embodiment.

FIGS. 4A to 4C illustrate the image processing apparatus according to the first exemplary embodiment.

FIG. 5A illustrates a criterion image. FIGS. 5B to 5E illustrate a relation between auto-correlation and cross-correlation.

DESCRIPTION OF THE EMBODIMENTS

Figure 2:
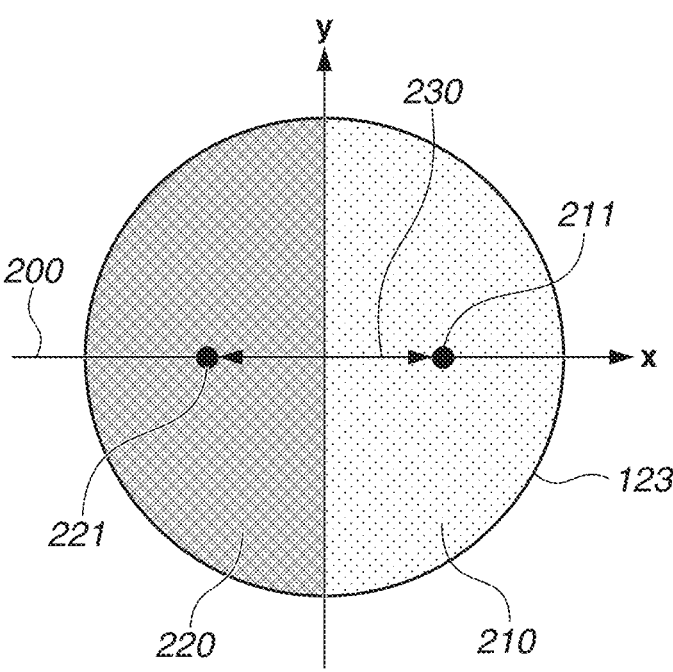
FIG. 2 illustrates a light flux received by an image sensor according to the first exemplary embodiment.

The present invention will now be described with reference to exemplary embodiments and the accompanying drawings. The present invention is not limited to the descriptions of each exemplary embodiment. Exemplary embodiments of the present invention can be suitably combined.

First Embodiment (Configuration of Imaging Apparatus)

FIG. 1A schematically illustrates a configuration of an imaging apparatus according to a first exemplary embodiment of the present invention.

Referring to FIG. 1A, the imaging apparatus 100 includes an image processing apparatus 110, an imaging unit 120, and a distance calculation unit 130.

The imaging unit 120 includes an image sensor 121 and an optical system 122.

The optical system 122 is an imaging lens of the imaging apparatus 100 and has a function of forming a subject image on the image sensor 121. The optical system 122 includes a plurality of lens groups (not illustrated), a diaphragm (not illustrated), and an exit pupil 123 disposed at a predetermined distance from the image sensor 121. According to the present specification, the z axis is parallel to an optical axis 140 of the optical system 122. The x and y axes are perpendicular to each other and are perpendicular to the optical axis 140.

The image sensor 121 includes a complementary metal oxide semiconductor (CMOS) sensor or a charge coupled device (CCD) sensor. A subject image via the optical system 122 is focused on the image sensor 121, and photo-electrically converted to an image signal based on the subject image.

FIG. 1B is an x-y cross-sectional view illustrating the image sensor 121. The image sensor 121 includes an array formed of a plurality of 2-row by 2-column pixel groups 150. A pixel group 150 includes four different pixels: diagonally arranged green pixels 150G1 and 150G2, a red pixel 150R, and a blue pixel 150B.

FIG. 1C is a cross-sectional view schematically illustrating the pixel group 150 taken along the I-I' line. Each pixel includes a light-receiving layer 182 and a light-guiding layer 181. The light-receiving layer 182 includes two different photoelectric conversion units (a first photoelectric conversion unit 161 and a second photoelectric conversion unit 162) for photo-electrically converting received light. The light-guiding layer 181 includes micro lenses 183 for efficiently guiding a light flux incident to the pixel to the photoelectric conversion units 161 and 162, color filters (not illustrated) for passing light having a predetermined wavelength band, and wiring (not illustrated) for reading an image and driving a pixel. Each pixel is provided with wiring (not illustrated) and is able to transfer an image signal (output signal) to the image processing apparatus 110 via the wiring. FIGS. 1B and 1C illustrate examples of the photoelectric conversion units divided into two in one pupil-division direction (x-axis direction). An image sensor having the photoelectric conversion units divided in two different pupil-division directions (x-axis and y-axis directions) is used according to specifications. The pupil-division direction and the number of divisions are optional.

FIG. 2 illustrates the exit pupil 123 of the optical system 122 viewed from the intersection (center image height) between the optical axis 140 and the image sensor 121. A first light flux and a second light flux that has passed a first pupil region 210 and a second pupil region 220 (different regions on the exit pupil 123) are incident on the photoelectric conversion units 161 and 162, respectively. The photoelectric conversion units 161 and 162 in each pixel photoelectrically convert incident light fluxes to generate image signals corresponding to an image A (first image) and an image B (second image). The generated image signals are transmitted to the image processing apparatus 110.

FIG. 2 illustrates the position of the center of gravity of the first pupil region 210 (first center of gravity 211), and the position of the center of gravity of the second pupil region 220 (second center of gravity 221). According to the present exemplary embodiment, the first center of gravity 211 is eccentrically disposed (shifted) from the center of the exit pupil 123 along a first axis 200. In contrast, the second center of gravity 221 is eccentrically disposed (shifted) from the center of the exit pupil 123 in the direction opposite to the direction of the first center of gravity 211 along the first axis 200. The direction connecting the first center of gravity 211 and the second center of gravity 221 is referred to as a pupil-division direction. The distance between the first center of gravity 211 and the second center of gravity 221 is a base length 230.

Figure 3A:
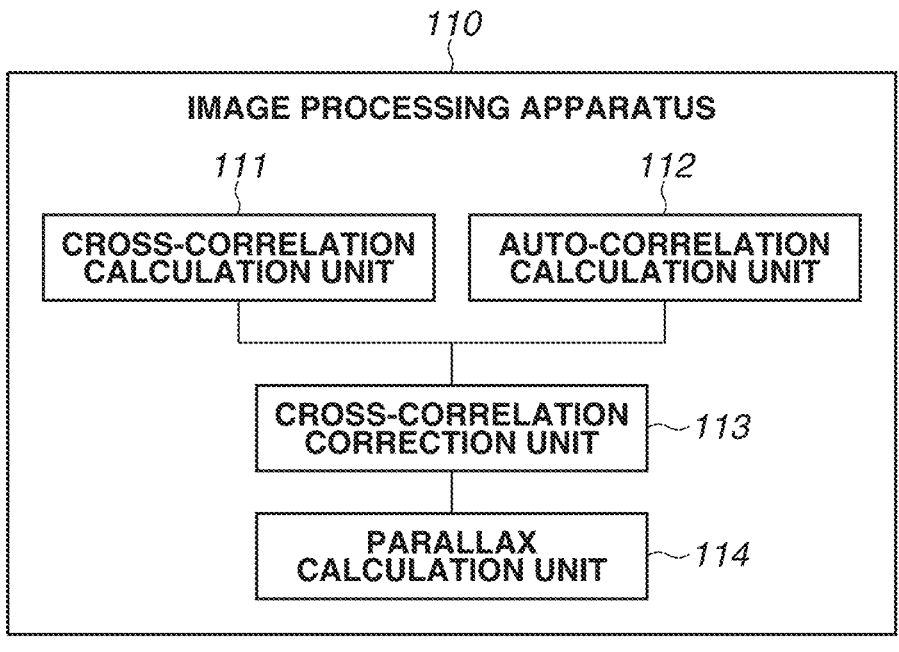
FIGS. 3A and 3B illustrate the image processing apparatus according to the first exemplary embodiment.
Figure 3B:
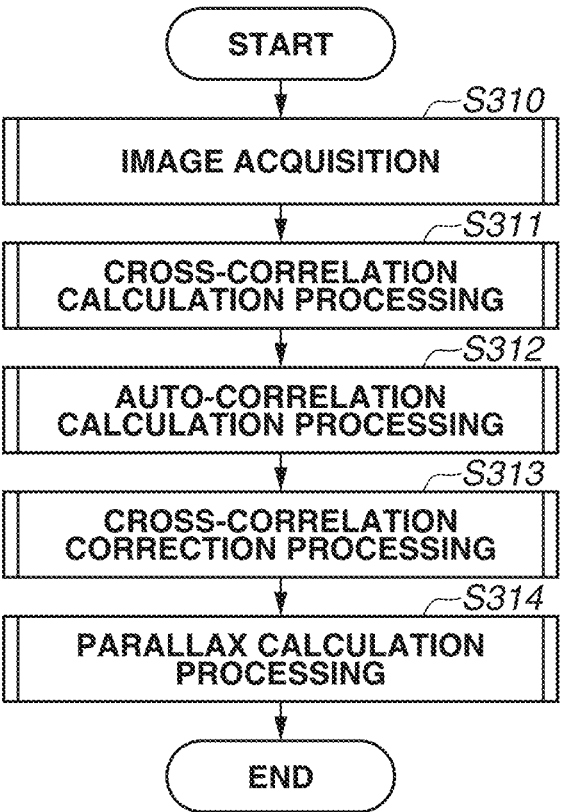

The image processing apparatus 110 in FIG. 1A will now be described with reference to FIGS. 3A and 3B. FIG. 3A schematically illustrates a configuration of the image processing apparatus 110 according to an exemplary embodiment of the present invention. Referring to FIG. 3A, the image processing apparatus 110 includes a cross-correlation calculation unit 111, an auto-correlation calculation unit 112, a cross-correlation correction unit 113, and a parallax calculation unit 114.

The image processing apparatus 110 can be configured by using logic circuits. Alternatively, the image processing apparatus 110 and the distance calculation unit 130 can include a control unit including a central processing unit (CPU) and a memory storing a calculation processing program.

The image processing apparatus 110 generates images A and B based on the received image signals.

The image processing apparatus 110 calculates a parallax value through the parallax calculation processing by using the images A and B, and stores the calculated parallax value in the main unit memory (not illustrated). The image processing apparatus 110 stores an image formed by adding the images A and B as image information in the main unit memory to allow the image to be used in the subsequent processing. The image processing apparatus 110 can also store the images A and B themselves in the main unit memory.

Returning to the description of FIG. 1A.

The distance calculation unit 130 can be configured by using logic circuits. As another configuration, the image processing apparatus 110 and the distance calculation unit 130 can include a CPU and a memory storing a calculation processing program.

The distance calculation unit 130 calculates the distance to a subject based on the received parallax information.

The positions of the images A and B are shifted in the same direction as the pupil-division direction (in the x-axis direction in the present exemplary embodiment) because of defocusing. The amount of this relative positional shift between the images A and B, i.e., the parallax amount between the images A and B corresponds to the defocus amount. The parallax amount can thereby be converted into the defocus amount by using a geometric relation based on the base length. The defocus amount can be converted into the subject distance by using the image forming relation of the optical system 122. The parallax amount can be converted into the defocus amount or the subject distance by multiplying the parallax amount by a predetermined conversion factor. The above-described method enables the distance calculation unit 130 to generate distance information in a target pixel.

(Descriptions of Processing of Image Processing Apparatus)

Processing of the image processing apparatus 110 according to the present exemplary embodiment will now be described. FIG. 3B is a flowchart illustrating an example of operation of the image processing apparatus 110 according to the present exemplary embodiment. The processing of the image processing apparatus 110 is implemented by the control unit (CPU or graphics processing unit (GPU)) loading software stored in a nonvolatile memory into a work memory and executing the software. This processing is started upon generation of image signals by the imaging unit 120.

In step S310, the control unit generates an image pair including the images A and B based on the image signals acquired from the imaging unit 120. The generated image pair is stored in the main unit memory (not illustrated).

In step S311, the cross-correlation calculation unit 111 calculates the cross-correlation. For example, the cross-correlation calculation unit 111 sets the image of a partial region including a pixel (target pixel) for distance calculation as a criterion image on the image A, and sets a reference image to the image B. Then, the cross-correlation calculation unit 111 calculates the cross-correlation value between the criterion image and the reference image while moving the position of the reference image in a predetermined direction. A method for calculating the cross-correlation value by the cross-correlation calculation unit 111 according to the present exemplary embodiment will now be described in detail.

FIGS. 4A to 4C illustrate positional relations between a criterion and a reference image set in step S311. FIG. 4A illustrates an image A 410A, FIG. 4B illustrates an image B 410B, and FIG. 4C illustrates the image A 410A.

In step S311, the cross-correlation calculation unit 111 calculates the cross-correlation value between the image A 410A and the image B 410B.

Specifically, the first cross-correlation calculation unit 111 sets as a criterion image 411 a partial region including a target pixel 420 and the neighboring pixels on the image A 410A. The cross-correlation calculation unit 111 then sets as a reference image 412 a region having the same area (image size) as the criterion image 411 on the image B 410B. The cross-correlation calculation unit 111 then moves (changes) the region of the reference image 412 on the image B 410B. Each time the region of the reference image 412 is moved, the cross-correlation calculation unit 111 calculates the cross-correlation value between the reference image 412 and the criterion image 411. The cross-correlation calculation unit 111 thereby generates a correlation value data string based on the cross-correlation value corresponding to each amount of movement (each region). In this case, the reference image 412 can be moved in any direction. According to the present exemplary embodiment, the moving direction of the reference image 412 is referred to as a parallax search direction. In particular, setting the parallax search direction and the above-described pupil-division direction (x-axis direction) to the same direction facilitates the above-described calculation performed by the distance calculation unit 130. According to the present exemplary embodiment, the parallax search direction is the x-axis direction.

Examples of methods for calculating the cross-correlation value include sum of squared differences (SSD), sum of absolute differences (SAD), and normalized cross-correlation (NCC). The present exemplary embodiment will be described below centering on the use of the SSD. This concept also applies to cases where other methods are used. The SSD according to the present exemplary embodiment evaluates the dissimilarity between the criterion image 411 and the reference image 412. This method determines a higher degree of correlation with the lower cross-correlation value.

In step S312, the auto-correlation calculation unit 112 subsequently sets as the criterion image the region used as the criterion image 411 in step S311. The auto-correlation calculation unit 112 also sets the reference image 412 in the image A.

The auto-correlation calculation unit 112 moves the position of the reference image 412 in the image A in the predetermined direction, and calculates at least two different correlation values (auto-correlation values) between the criterion image 411 and the reference image 412. The auto-correlation calculation unit 112 moves the reference image 412 by at least one pixel in the −x direction and by at least one pixel in the +x direction, and calculates the auto-correlation value in each movement. The auto-correlation value can be obtained with high accuracy by calculating the correlation values when the reference image 412 is moved by one pixel in the −x direction and when the reference image 412 is moved by one pixel in the +x direction. According to the present exemplary embodiment, the auto-correlation calculation unit 112 calculates the correlation values when the reference image 412 is moved by one pixel in the −x direction and when the reference image 412 is moved by one pixel in the +x direction. Although the reference image 412 can be moved in any direction, the correction (described below) can be performed with high accuracy by moving the reference image 412 in the same direction as the parallax search direction of the cross-correlation value.

Specifically, the auto-correlation calculation unit 112 sets the criterion image 411 similar to that in step S311. As illustrated in FIG. 4C, the auto-correlation calculation unit 112 then sets as a reference image 413 a region having the same area (image size) as the criterion image 411 on the image A 410A. The auto-correlation calculation unit 112 then moves (changes) the region of the reference image 413 in the parallax search direction on the image A 410A, and calculates the correlation value between the reference image 413 and the criterion image 411 each time the region of the reference image 413 is moved. The auto-correlation calculation unit 112 thereby generates a correlation value data string based on the cross-correlation value corresponding to each amount of movement (each region).

The auto-correlation value can be calculated by using any known method. However, when the similarity is calculated based on the cross-correlation value, in one embodiment, the similarity is similarly calculated based on the auto-correlation value. When the dissimilarity is calculated based on the cross-correlation value, in one embodiment, the dissimilarity is similarly calculated based on the auto-correlation value. The auto-correlation calculation unit 112 according to the present exemplary embodiment uses the SSD as a method for calculating the auto-correlation value, similarly to the cross-correlation calculation unit 111.

In step S313, the cross-correlation correction unit 113 calculates the correction correlation value. According to the present exemplary embodiment, the cross-correlation correction unit 113 corrects the cross-correlation value by using the ratio of the at least two different auto-correlation values obtained in step S312, and calculates a corrected cross-correlation value. A method for correcting the cross-correlation value will now be described.

Firstly, the reason why an error occurs in the parallax calculation result due to the pixel value change at the criterion image edge will be described. The following descriptions will be made on the assumption that the images A and B have the same shading and a parallax of +0.1 pixels. FIGS. 5A to 5E illustrate the cause of error occurrence.

FIG. 5A illustrates a positional relation between an image A 501 and criterion images 502 and 503. The image A 501 is an image (subject) having a line pattern where a light region and a dark region appear in alternation. The criterion image 502 includes image edges 504 and 505 (boundaries) where a pattern of a light region and a dark region in the image A 501 switch.

A case will now be described where the edge texture has no asymmetry (the pixel value at an edge of the criterion image changes by the same amount in the positive (+) and negative (−) directions along the same axial direction).

FIG. 5B illustrates the auto-correlation value calculated by moving a reference image set for the criterion image 502 and then performing the auto-correlation calculation between the criterion image 502 and the reference image.

Auto-correlation values C(0), C(+1), and C(−1) (hereinafter, sometimes simply referred to as C(0), C(+1), and C(−1), respectively) are auto-correlation values when the position of the reference image is moved by 0, +1, and −1 pixel in the x-axis direction, respectively. In the following descriptions, C(x) denotes the auto-correlation value corresponding to the amount of movement x (in the x-axis direction) from a pixel position 0 where the positions of the criterion and the reference images are identical. When the amount of movement is 0 (pixels), the two images are identical, and the cross-correlation value C(0) is 0. When the reference image is moved by +1 or −1 pixel in the x-axis direction, a difference (different pixel value) between the criterion image 502 and the reference image is caused by the image edges 504 and 505. The auto-correlation values C(+1) and C(−1) are therefore larger than the auto-correlation value C(0). When the edge texture has no asymmetry, the amounts of movement of the reference image corresponding to the auto-correlation values C(+1) and C(−1) have the same absolute values, resulting in the same difference between the two images due to the image edges 504 and 505 on the line pattern corresponding to these auto-correlation values. The auto-correlation values C(1) and C(−1) therefore have the same value (i.e., the auto-correlation value has no asymmetry). When the auto-correlation value is interpolated with a quadratic function, the auto-correlation value draws a curve 510C. The auto-correlation curve indicating continuous changes of the auto-correlation value coincides with the curve 510C.

FIG. 5D illustrates a cross-correlation value calculated through the cross-correlation calculation between the criterion image 502 and a reference image set for the criterion image 502. Since the parallax between the images A and B is +0.1 pixels, the cross-correlation curve indicating continuous changes of the cross-correlation value has a shape of the curve 510C moved by +0.1 pixels and coincides with a curve 510S as a quadratic function. When the position of the reference image is moved by 0, +1, and −1 pixel in the x-axis direction, the respective cross-correlation values S(0), S(1), and S(−1) (hereinafter, sometimes simply referred to as S(0), S(+1), and S(−1), respectively) are values on the curve 510S. In the following descriptions, S(x) denotes a cross-correlation value corresponding to the amount of movement x (in the x-axis direction) from an integer pixel position 0 of the reference image where the cross-correlation value is minimized.

When the edge texture has no asymmetry in such a manner, the auto-correlation value has no asymmetry, and the cross-correlation curve becomes a quadratic function. In other words, a fitting function is symmetric centering on the true parallax position as the boundary, and is symmetric with respect to the boundary axis like a quadratic function. The image processing apparatus 110 moves the curve 510C as a quadratic function that can be calculated from the auto-correlation curve, and estimates the position where the curve 510C fits the cross-correlation value, making it possible to accurately calculate the parallax.

A case will now be described where the edge texture has the asymmetry. This is a case where the amount of pixel value change at the criterion image edge is different between the + and − directions along the same axial direction.

For the criterion image 503, the image edge 504 overlaps with the right edge of the criterion image 503. FIG. 5C illustrates the auto-correlation value calculated by moving a reference image set for the criterion image 503 and then performing the auto-correlation processing between the criterion image 503 and the reference image. When the amount of movement is 0, the two images are identical, and the auto-correlation value C(0) is 0. When the amount of movement is +1 pixel in the x-axis direction, the auto-correlation value C(+1) is larger than the auto-correlation value C(0), similarly to the case of the criterion image 502. In contrast, when the amount of movement is −1 pixel in the x-axis direction, a difference between the criterion and the reference images is caused only by the image edge 505. Thus, the value of the difference between the images for the change from the auto-correlation value C(0) to the auto-correlation value C(−1) is smaller than the value of the difference for the change from the auto-correlation value C(0) to the auto-correlation value C(+1). In this case, the auto-correlation value is therefore asymmetric between a case where the amount of movement of the reference image is positive and a case where the amount of movement is negative. When the amount of movement of the reference image is positive, the auto-correlation value draws a curve 511C. When the amount of movement is negative, the auto-correlation value draws a curve 512C.

FIG. 5E illustrates a cross-correlation value calculated through the cross-correlation calculation between the criterion image 503 and a reference image set for the criterion image 503. Since the images A and B have a parallax of +0.1 pixels, curves 511S and 512S as a result of interpolating the cross-correlation value with a quadratic function have shapes of the curves 511S and 512S moved by +0.1 pixels, respectively. When the position of the reference image is moved by 0 and −1 pixel in the x-axis direction, the respective cross-correlation values S(0) and S(−1) are values on the cross-correlation curve 512S. When the position of the reference is move by +1 pixel in the x-axis direction, the cross-correlation value S(1) is a value on the cross-correlation curve 511S. When the amount of movement is more positive than +0.1 pixels of the true parallax value, the cross-correlation value draws the curve 511S. When the amount of movement is more negative than +0.1 pixels thereof, the cross-correlation value draws the curve 512S.

When the edge texture has such the asymmetry as described above, the auto-correlation value has the asymmetry, and the cross-correlation curve is not symmetric with respect to the boundary axis. In this case, if the fitting function is a y-axis symmetric function, such as a quadratic function, a large error occurs in the parallax calculation. In this state, the shape of the fitting function is different from a conventionally known shape. Such a state where the fitting function is asymmetric with respect to the true parallax position as the boundary is referred to as the asymmetry of the fitting function. With a fitting function having the asymmetry, when the image processing apparatus 110 moves the curve 511C or 512C as a quadratic function calculated from the auto-correlation curve and then estimates the position where the curve 511C or 512C fits the cross-correlation value existing on the different correlation curve, a large error may possibly occur in the parallax calculation.

As described above, the fitting function assumed by a conventional technique is a quadratic function because the auto-correlation and the cross-correlation values use the SSD. However, when the SAD is used, the fitting function is a linear function having an equiangular straight line. In this way, the fitting function changes depending on the auto-correlation value and the method for calculating the correlation value.

This completes the description of an error occurring in the parallax calculation result due to the asymmetry of the edge texture.

Even when the parallax amount between the images A and B is not 0.1 pixels, an error may possibly occur for a similar reason. When sub pixel estimation is performed by using only the cross-correlation value as is the case with a known parabola fitting technique, an error also occurs for a similar reason.

An error occurring in the parallax calculated without taking the asymmetry of the fitting function into consideration cannot be accurately corrected. The reason of this inconvenience will now be described. Assume an example case where the cross-correlation values S(1) and S(−1) are corrected but the cross-correlation value S(0) is not corrected. Referring to the example in FIG. 5E, only the curve 512S as a quadratic function passes through the cross-correlation value S(0) and the point where the cross-correlation becomes 0 with +0.1 pixels. The accurate correction is therefore determined when the correction is performed such that the correlation value after the correction exits on the curve 512S. The cross-correlation value S(−1) does not need to be corrected because it originally exists on the curve 512S. In contrast, the cross-correlation value S(1) is to be corrected because it exists on the curve 511S. When the asymmetry of the fitting function is not taken into consideration, the correction amount y calculated from the auto-correlation value is subtracted from the cross-correlation value S(1) and added to the cross-correlation value S(−1) in the correction processing. The correction amount y is the inclination when C(−1) and C(1) are interpolated with a straight line. More specifically, referring to FIG. 5E, the correction amount y has a non-zero value and therefore the cross-correlation value S(−1) that does not need to be corrected will be unsuitably corrected.

This completes the description of the reason why an error cannot be suitably corrected when the asymmetry of the fitting function is not taken into consideration. The issue in this case is failure to take into consideration the fact that the correction amount is asymmetric with respect to the parallax position as the boundary, i.e., the correction amount has different values on the positive and the negative sides.

However, the processing in step S313 calculates the cross-correlation value corrected in consideration of the asymmetry of the fitting function (corrected cross-correlation value). The above-described error can be reduced by using the corrected cross-correlation value in the parallax calculation in step S314 (described below).

Referring to FIGS. 5A to 5C, the larger the auto-correlation value on the positive side in the parallax search direction, the larger the cross-correlation value on the positive side in the parallax search direction with reference to the true sub pixel parallax. The larger the auto-correlation value on the negative side in the parallax search direction, the larger the cross-correlation value on the negative side in the parallax search direction with reference to the true sub pixel parallax. Thus, the asymmetry of the fitting function included in the cross-correlation value can be corrected by performing the correction in the following way: the larger the auto-correlation value, the smaller the degree of correction on the cross-correlation value in the same parallax search direction with reference to the true sub pixel parallax.

Figures 6A, 6B:
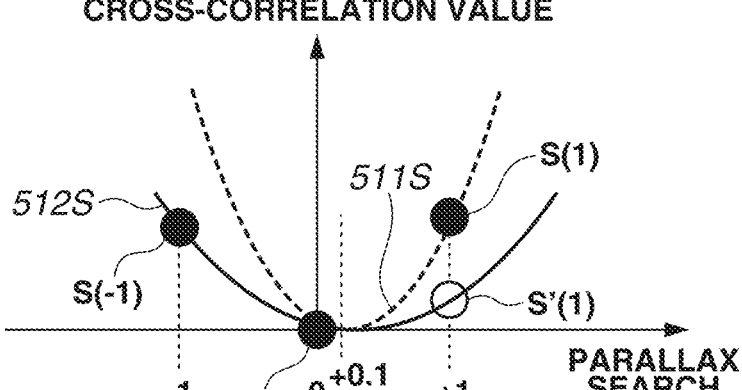
FIGS. 6A and 6B illustrate a cross-correlation correction unit according to the first exemplary embodiment.

For example, FIG. 6A illustrates a state where the cross-correlation value in FIG. 5E is corrected. Referring to FIG. 6A, the correction is performed so that the cross-correlation value S(1) existing on the curve 511S in FIG. 5E moves onto the curve S512. The above-described correction can be performed by correcting the cross-correlation values to be used in the parallax calculation so that the cross-correlation values exist on the same quadratic function. Any cross-correlation value can be subjected to this correction. A case of using the cross-correlation value S(0) will be described below. When the cross-correlation value S(0) is used, more specifically, a corrected cross-correlation value S' can be calculated by using the Formula 1 or 2.

$$S'(0) = S(0) \times \frac{C(1)}{C(-1)} \qquad \text{[Formula 1]}$$

$$S'(0) = S(0) \times \frac{C(-1)}{C(1)} \qquad \text{[Formula 2]}$$

Referring to the Formulas 1 and 2, S'(x) denotes the corrected cross-correlation value corresponding to the amount of movement x from 0 assuming that the integer pixel position of the reference image where the cross-correlation value is minimized is 0. The Formula 1 is a correction formula that is particularly useful when the true sub pixel parallax is estimated to exist on the positive side in the parallax search direction, from the integer pixel position of the reference image where the cross-correlation value is minimized. The Formula 2 is a correction formula that is particularly useful when the true sub pixel parallax is estimated to exist on the negative side in the parallax search direction, from the integer pixel position of the reference image where the cross-correlation value is minimized.

Which of the Formula 1 or 2 is to be used can be determined by estimating the true sub pixel parallax position. In this case, a known technique is also applicable. For example, by comparing the values of S(1) and S(−1), the true sub pixel parallax position can be determined to exist on the side of the smaller value.

Alternatively, the cross-correlation value can also be corrected in consideration of the asymmetry of the fitting function in the estimation. For example, the true sub pixel parallax position can be determined to exist on the side of the smaller value by comparing the values of S(1)/C(1) and S(−1)/C(−1).

Alternatively, a predetermined calculation method can be constantly used instead of estimating the true sub pixel parallax position.

The Formulas 1 and 2 do not limit the correction method. Applicable methods include methods for correcting the cross-correlation value in consideration of the asymmetry of the fitting function.

Even when different calculation methods are used between the auto-correlation value and the cross-correlation value, methods similar to the above-described ones are applicable.

Although the above-described method corrects only one point of the cross-correlation value, different points of the cross-correlation value to be used in the sub pixel estimation can be corrected. For example, FIG. 6B illustrates a state where different points of the cross-correlation value in FIG. 5E are corrected. In this case, an optional quadratic function is set, and the correction is performed so that all of the cross-correlation values to be used in the parallax calculation exist on the function. When the inclination of the optional quadratic function is 1, the cross-correlation value can be corrected by using the ratio of the cross-correlation value and the auto-correlation value. The above descriptions do not limit the correction method. Applicable methods include methods for correcting the cross-correlation value in consideration of the asymmetry of the fitting function.

This completes the description of step S313. Returning to the description of the flowchart in FIG. 3B.

In step S314, the parallax calculation unit 114 calculates the parallax amount of the image pair including the images A and B by using an optional known technique. Applicable techniques include techniques for using the cross-correlation value and techniques for using the cross-correlation value and the auto-correlation value. The present exemplary embodiment uses the corrected cross-correlation value calculated by the cross-correlation correction unit 113, instead of the cross-correlation value. For example, a certain conventional method calculates a sub pixel parallax amount d represented by the Formula 3. The present exemplary embodiment calculates the sub pixel parallax amount d by using the Formula 4 where the cross-correlation value in Formula 3 is replaced with the corrected cross-correlation value.

$$d = \frac{S(0) - S(1)}{2C(1)} + \frac{1}{2} \qquad \text{[Formula 3]}$$

$$d = \frac{S'(0) - S(1)}{2C(1)} + \frac{1}{2} \qquad \text{[Formula 4]}$$

The Formula 3 calculates the minimum value position when S(0) and S(1) exist on the same quadratic function having an inclination C(1). As described above, S(0) and S(1) do not necessarily exist on the same quadratic function because of the asymmetry of the fitting function, and thus the parallax amount is not suitably corrected. In contrast, Formula 4 is corrected so that S'(0) exists on the same quadratic function as S(1), and thus the Formula 4 can calculate the minimum value position where a small error occurs.

The Formula 4 does not limit the correction method. Applicable methods include methods for using the corrected cross-correlation value in consideration of the asymmetry of the fitting function.

Although the auto-correlation calculation unit 112 according to the present exemplary embodiment calculates the auto-correlation value by using the image A, the auto-correlation calculation unit 112 can calculate the auto-correlation value by using the image B. When the auto-correlation calculation unit 112 calculates the auto-correlation value by using the image B, in one embodiment, the position is shifted for setting the target pixel 420 by using the amount of movement calculated by the parallax calculation unit 114.

The cross-correlation correction unit 113 according to the present exemplary embodiment uses only the auto-correlation value with which the amount of movement of the reference image is +1 pixel and −1 pixel. To reduce the amount of calculation, in one embodiment, the auto-correlation value is calculated for the amount of movement by +1 pixel and −1 pixel. The operation flow of the image processing apparatus 110 according to the present exemplary embodiment has been described above on the premise that steps S311 to S314 are sequentially performed. However, step S312 can be performed before step S311.

Although the image processing apparatus 110 according to the present exemplary embodiment performs the correction for all pixels, the image processing apparatus 110 can additionally include a determination unit for determining whether to perform the correction, to perform the correction only for necessary pixels. In this case, the determination unit can obtain the reliability of the auto-correlation value and the cross-correlation value by using a known technique and perform the correction only in a case of the high reliability. Alternatively, the determination unit can determine the degree of the asymmetry of the fitting function based on the auto-correlation value and perform the correction only in a case of the strong asymmetry. For example, the determination unit can determine that the asymmetry is strong in a case of the large difference between C(−1) and C(1).

The image processing apparatus 110 according to the present exemplary embodiment can subject the image pair acquired in step S310 to processing for correcting the light amount imbalance mainly caused by the vignetting of the optical system 122. More specifically, the image processing apparatus 110 can correct the light amount balance by correcting the luminance values of the images A and B to be approximately constant regardless of the angle of field based on the result of pre-capturing a planar light source with a constant luminance via the imaging apparatus 100. For example, a band-pass or low-pass filter can be applied to the acquired images A and B to reduce the influence of optical shot noise occurring in the image sensor 121.

The image processing apparatus 110 according to the present exemplary embodiment performs the parallax search in the one-dimensional parallax search direction, the image processing apparatus 110 can also perform the parallax search in the two- and higher dimensional parallax search directions. In this case, the dimension can be expanded by using any known technique. For example, it is also possible to calculate a two-dimensional parallax by calculating the parallax in the x direction and then calculating the parallax in the y direction by using the image processing apparatus 110 according to the present exemplary embodiment.

The image processing apparatus according to the present exemplary embodiment calculates the parallax amount by using the cross-correlation value corrected by using the auto-correlation value. This processing corrects the asymmetry of the fitting function appearing in the cross-correlation value to enable resolving the asymmetry of the fitting function in the sub pixel estimation. This enables reducing a parallax amount calculation error due to the asymmetry of the fitting function to reduce a distance measurement error, thus achieving high-accuracy distance measurement.

Second Embodiment

A second exemplary embodiment of the present invention will now be described with reference to the accompanying drawings. Components described in the present exemplary embodiment are to be considered as illustrative, and the scope of the present invention is not limited to the components according to the present exemplary embodiment.
(Configuration of Image Processing Apparatus)

Figure 7A:
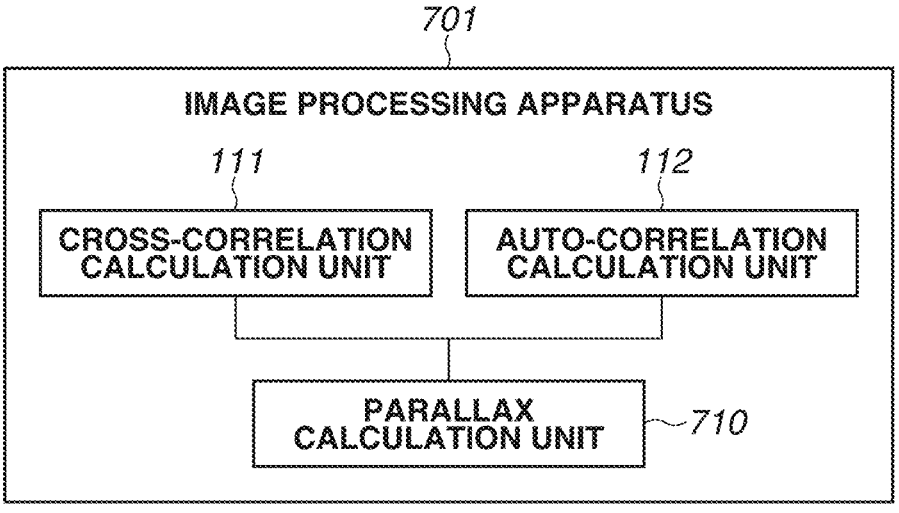
FIGS. 7A and 7B illustrate an image processing apparatus according to a second exemplary embodiment.
Figure 7B:
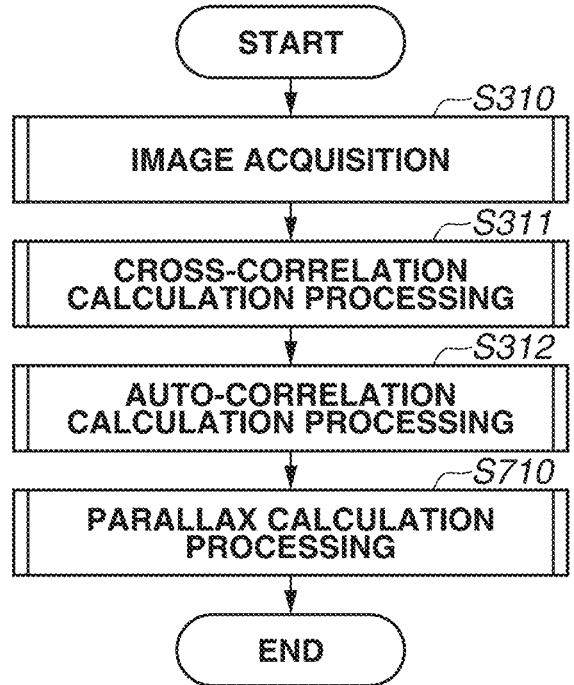

An image processing apparatus 701 according to the present exemplary embodiment will now be described. FIG. 7A schematically illustrates a configuration of the image processing apparatus 701 according to the present exemplary embodiment of the present invention. Referring to FIG. 7A, the image processing apparatus 701 includes a cross-correlation calculation unit 111, an auto-correlation calculation unit 112 and a parallax calculation unit 710. FIG. 7B is a flowchart illustrating the operation of the image processing apparatus 701 according to the present exemplary embodiment. When image processing according to the present exemplary embodiment is started, the processing proceeds to step S310. Referring to FIGS. 7A and 7B, elements identical to the configuration and operation in FIGS. 3A and 3B are assigned the same reference numerals as those in FIGS. 3A and 3B, respectively, and redundant descriptions thereof will be omitted.

The image processing apparatus 701 can be configured by using logic circuits. As another configuration, the image processing apparatus 701 can include a CPU and a memory storing a calculation processing program.

The image processing apparatus 701 generates images A and B based on the received image signals.

The image processing apparatus 701 calculates a parallax value through the parallax calculation processing by using the images A and B, and stores the calculated parallax value in the main unit memory (not illustrated). The image processing apparatus 701 stores an image formed by adding the images A and B as image information in the main unit memory to allow the images to be used in the subsequent processing. The image processing apparatus 701 can also store the images A and B themselves in the main unit memory.

In step S710, the parallax calculation unit 710 calculates the parallax amount of the image pair including the images A and B based on a combination of the cross-correlation value and the auto-correlation value not affected by the asymmetry of the fitting function.

Referring to FIGS. 5A to 5E, one cause of the error lies in fitting the correlation values existing on different functions into one function. The above-described error can thus be reduced by calculating the parallax by using only the cross-correlation value suitable for the function to be used.

For example, when the auto-correlation value curve 511C is used, the parallax can be calculated by using the cross-correlation value S(1). When the auto-correlation value curve 511C is horizontally moved in the parallax search direction, the amount of movement with which the cross-correlation value S(1) exists on the auto-correlation value curve 511C is the sub pixel parallax amount d.

More specifically, the above-described amount of movement can be calculated by the Formula 5. Referring to the positional relations in FIG. 5E, the cross-correlation value S(1) exists on the more positive side in the parallax search direction than the minimal value of the auto-correlation value curve 511C. The sub pixel parallax amount d can thus be uniquely defined.

$$disp = 1 - \sqrt{\frac{S(1)}{C(1)}} \qquad \text{[Formula 5]}$$

Based on a similar concept, the sub pixel parallax can also be calculated when other cross-correlation values, such as S(−1) and S(0), are used.

The Formula 5 does not limit the correction method. Applicable methods include methods for calculating the parallax, in consideration of the asymmetry of the fitting function, based on a combination of the cross-correlation value and the auto-correlation value not affected by the symmetry.

Although the above-described method calculates the parallax amount based on the auto-correlation curve and one cross-correlation value, the parallax amount can be calculated based on the auto-correlation curve and a plurality of cross-correlation values. For example, the parallax can be calculated based on the auto-correlation value curve 512C, and the cross-correlation values S(−1) and S(0).

Alternatively, when the auto-correlation value curve 512C is used, the parallax can be calculated by using a conventional technique (Formula 3) based on the cross-correlation values S(−1) and S(0).

In this case, the formula to be used can be changed by estimating the true sub pixel parallax position to estimate the function on which the cross-correlation value exists. In this case, a known technique is also applicable. For example, the true sub pixel parallax position can be determined to exist on the side of the smaller value by comparing the values of S(1) and S(−1).

Alternatively, the cross-correlation value can be corrected in consideration of the asymmetry of the fitting function in the estimation. For example, the true sub pixel parallax position can be determined to exist on the side of the smaller value by comparing the values of S(1)/C(1) and S(−1)/C(−1).

Alternatively, a predetermined calculation method can be constantly used instead of estimating the true sub pixel parallax position.

Although the image processing apparatus 701 according to the present exemplary embodiment calculates the parallax amount based on only one combination of the cross-correlation value and the auto-correlation curve, the image processing apparatus 701 can calculate the parallax amount based on a plurality of combinations of the cross-correlation value and the auto-correlation curve. For example, the image processing apparatus can calculate the parallax by using the auto-correlation value curve 511C and the cross-correlation value S(1), and thereafter calculate the parallax by using the auto-correlation value curve 512C and the cross-correlation value S(−1). In this case, a plurality of results of calculating the parallax amount can be averaged. In addition, the final parallax amount may be determined based on the used auto-correlation value or cross-correlation value, or the reliability of the auto-correlation and the cross-correlation values.

The image processing apparatus according to the present exemplary embodiment calculates the parallax amount by using a combination of the cross-correlation and the auto-correlation values not affected by the asymmetry of the fitting function. This processing corrects the formula for parallax calculation to enable calculating the parallax without being affected by the asymmetry of the fitting function. This enables reducing a parallax amount calculation error due to the asymmetry of the fitting function to reduce a distance measurement error, thus achieving high-accuracy distance measurement.

The image processing apparatus according to the present exemplary embodiment can reduce the amount of calculation processing for parallax calculation.

Third Embodiment

A third exemplary embodiment of the present invention will now be described in detail with reference to the accompanying drawings. Components described in the present exemplary embodiment are to be considered as illustrative, and the scope of the present invention is not limited to the components according to the present exemplary embodiment.

(Configuration of Image Processing Apparatus)

Figure 8A:
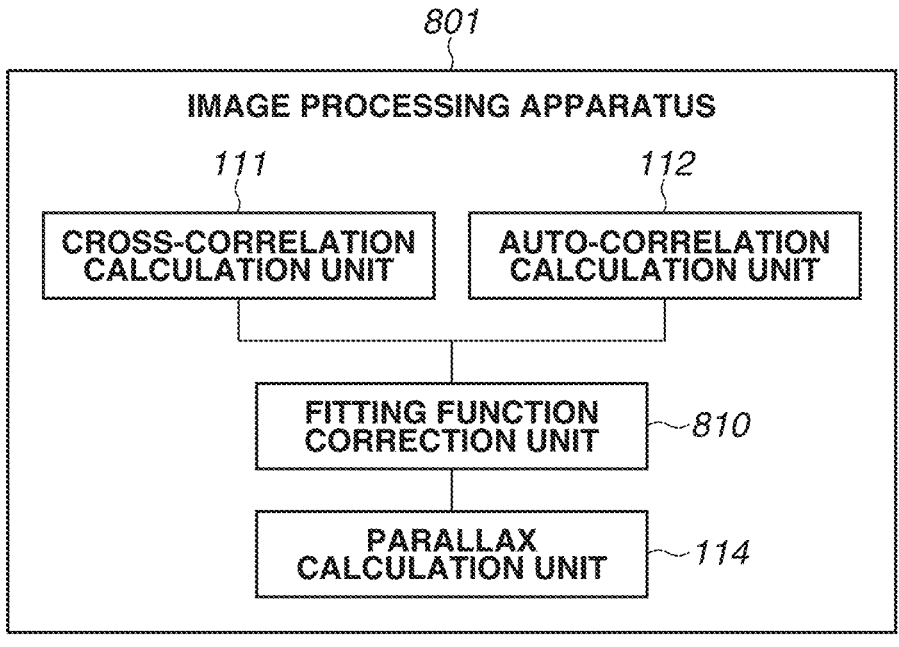
FIGS. 8A and 8B illustrate an image processing apparatus according to a third exemplary embodiment.
Figure 8B:
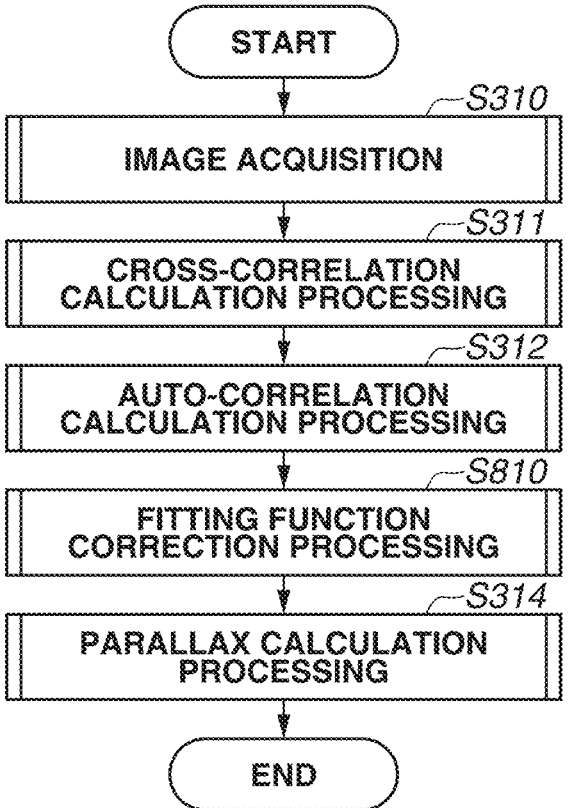

An image processing apparatus 801 according to the present exemplary embodiment will now be described. FIG. 8A schematically illustrates a configuration of the image processing apparatus 801 according to the present exemplary embodiment of the present invention. Referring to FIG. 8A, the image processing apparatus 801 includes a cross-correlation calculation unit 111, an auto-correlation calculation unit 112, a fitting function correction unit 810, and a parallax calculation unit 114. FIG. 8B is a flowchart illustrating the operation of the image processing apparatus 801 according to the present exemplary embodiment. When the image processing according to the present exemplary embodiment is started, the processing proceeds to step S310. Referring to FIGS. 8A and 8B, elements identical to the configuration and operation in FIGS. 3A and 3B are assigned the same reference numerals as those in FIGS. 3A and 3B, respectively, and redundant descriptions thereof will be omitted.

The image processing apparatus 801 can be configured by using logic circuits. As another configuration, the image processing apparatus 801 can include a CPU and a memory storing a calculation processing program.

The image processing apparatus 801 generates images A and B based on the received image signals.

The image processing apparatus 801 calculates a parallax value through the parallax calculation processing by using the images A and B, and stores the calculated parallax value in the main unit memory (not illustrated). The image processing apparatus 801 stores an image formed by adding the images A and B as image information in the main unit memory to allow the images to be used in the subsequent processing. The image processing apparatus 801 can also store the images A and B themselves in the main unit memory.

In step S810, the fitting function correction unit 810 estimates the asymmetry of the fitting function by using the auto-correlation value and corrects the fitting function.

In the parallax calculation processing performed in step S314, the fitting function correction unit 810 fits the function determined by the method for calculating the cross-correlation value into the cross-correlation value. This function has conventionally been used for its shape symmetric with respect to the parallax as the boundary. However, the function actually has a shape asymmetric with respect to the parallax as the boundary due to the asymmetry of the edge texture, as described above with reference to FIGS. 5A to 5E. In step S810, the fitting function correction unit 810 estimates such asymmetry and calculates the shape of the fitting function that fits the cross-correlation value.

More specifically, this asymmetry is estimated by using the auto-correlation value calculated in step S312. Referring to the examples in FIGS. 5A to 5E, the use of C(−1) and C(1) enables calculating two different inclinations of the quadratic function. C(−1) is the secondary coefficient on the left-hand side of the parallax as the boundary, and C(1) is the secondary coefficient on the right-hand side of the parallax as the boundary.

Asymmetrically correcting the fitting function conventionally having a symmetric shape enables fitting an asymmetric fitting function into the cross-correlation value in the following step S314.

This enables reducing a parallax amount calculation error due to the asymmetry of the fitting function to reduce a distance measurement error, thus achieving high-accuracy distance measurement.

The image processing apparatus according to the present exemplary embodiment enables performing high-accuracy distance measurement even in a noisy environment.

Fourth Embodiment

A fourth exemplary embodiment of the present invention will now be described in detail with reference to the accompanying drawings. Components described in the present exemplary embodiment are to be considered as illustrative, and the scope of the present invention is not limited to the components according to the present exemplary embodiment.

(Apparatus Configuration)

Figure 9:
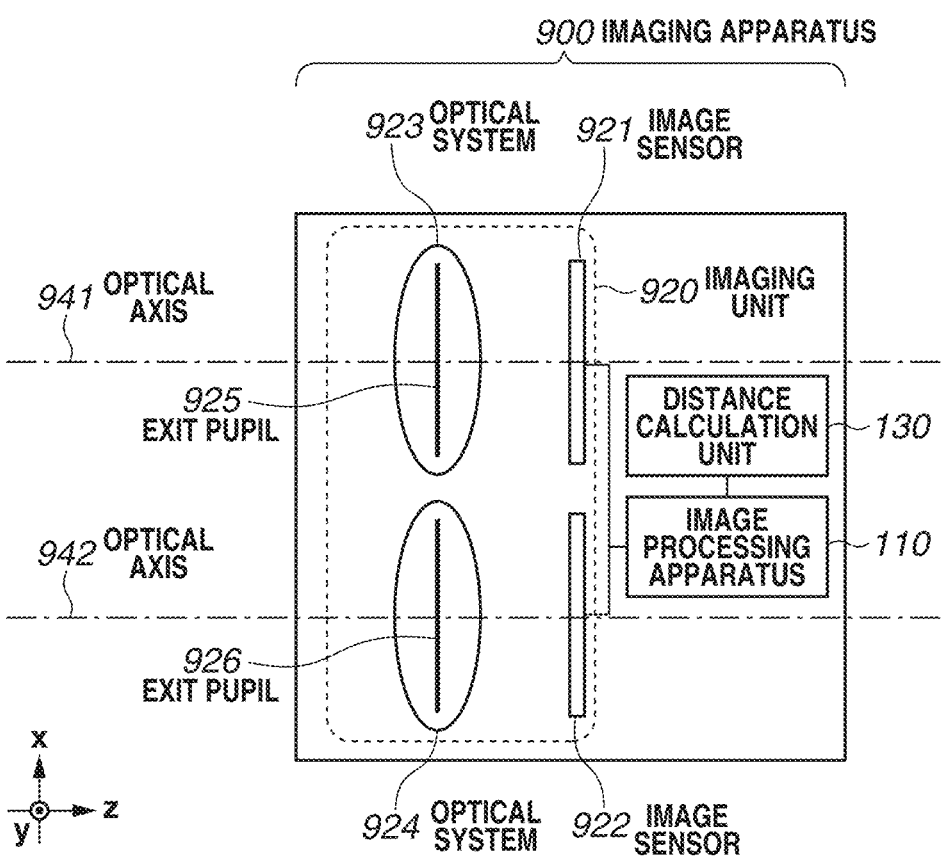
FIG. 9 illustrates an imaging apparatus according to a fourth exemplary embodiment.

FIG. 9 schematically illustrates a configuration of the image processing apparatus according to the exemplary embodiment of the present invention. Referring to FIG. 9, elements identical to the configuration in FIG. 1A are assigned the same reference numerals as those in FIG. 1A, and redundant descriptions thereof will be omitted.

Referring to FIG. 9, an imaging apparatus 900 includes an image processing apparatus 110, an imaging unit 920, and a distance calculation unit 130.

The imaging unit 920 includes two different image sensors 921 and 922 and two different optical systems 923 and 924. The optical systems 923 and 924 are imaging lenses of the imaging apparatus 900 and have a function of forming a subject image on the image sensors 921 and 922, respectively. The optical systems 923 and 924 includes a plurality of lens groups (not illustrated), a diaphragm (not illustrated), and exit pupils 925 and 926 disposed at a predetermined distance from the image sensors 921 and 922, respectively. The optical systems 923 and 924 have optical axes 941 and 942, respectively.

The parallax between images can be accurately calculated by pre-calibrating parameters, such as the positional relation between the optical systems 923 and 924. The parallax between images can also be accurately calculated by correcting lens distortions in the optical systems 923 and 924.

In this case, it is possible to improve the flexibility in designing the base length and the distance measurement resolution.

The present exemplary embodiment includes two different optical systems for acquiring the images A and B having a distance-related parallax. Alternatively, the present exemplary embodiment can include a stereo camera having three or more optical systems and corresponding image sensors.

The present exemplary embodiment uses the image processing apparatus according to the first exemplary embodiment. Alternatively, and the present exemplary embodiment can use the image processing apparatus according to the second or the third exemplary embodiment.

The scope of the present invention includes a computer program in addition to a distance measuring apparatus. The computer program according to the present exemplary embodiment causes a computer to execute predetermined processes to calculate the distance or the parallax amount. The program according to the present exemplary embodiment is installed in a computer of a distance measuring apparatus or an imaging apparatus, such as a digital camera, including the distance measuring apparatus. When the installed program is executed by the computer, the above-described functions are implemented, enabling high-speed and high-accuracy parallax calculation.

The present invention can also be achieved when a program for implementing one or more functions according to the above-described exemplary embodiments is supplied to a system or apparatus via a network or storage medium, and one or more processors in a computer of the system or apparatus read and execute the program. Further, the present invention can also be achieved by a circuit, such as an application specific integrated circuit (ASIC), for implementing one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-052634, filed Mar. 28, 2022, which is hereby incorporated by reference herein in its entirety.

What is claimed is:

1. An apparatus for calculating a parallax based on a first image and a second image, the apparatus comprising:
   one or more memories storing instructions; and
   one or more processors executing the instructions to:
   calculate a cross-correlation value between a first criterion image set on the first image and a first reference image set on the second image;
   calculate an auto-correlation value between a second criterion image and a second reference image set on either one of the first image and the second image;
   calculate a parallax amount between the first image and the second image by using the cross-correlation value and the auto-correlation value; and
   correct the cross-correlation value by using the auto-correlation value of a formula,
   wherein the cross-correlation value is corrected using the formula depending on when a sub pixel parallax is estimated to exist on a positive side or a negative side in a parallax search direction.

2. The apparatus according to claim 1, wherein the one or more processors further execute the instructions to:
   change a position of the first reference image to calculate at least two cross-correlation values; and
   move the position of the second reference image by at least +1 pixel and −1 pixel in an optional direction to calculate at least two auto-correlation values,
   wherein the parallax amount is calculated based on a corrected cross-correlation value or the cross-correlation value, and the corrected cross-correlation value, the corrected cross-correlation value being obtained by correcting the cross-correlation value by using neighboring values of a minimum value of the auto-correlation value.

3. The apparatus according to claim 2, wherein the corrected cross-correlation value is calculated by using a ratio of two auto-correlation values involving different amounts of movement of the second reference image with respect to at least one cross-correlation value.

4. The apparatus according to claim 2, wherein the corrected cross-correlation value is calculated by using a ratio of the cross-correlation value and the auto-correlation value with respect to the at least two cross-correlation values.

5. An apparatus for calculating a parallax based on a first image and a second image, the apparatus comprising:
   one or more memories storing instructions; and
   one or more processors executing the instructions to:
   calculate a cross-correlation value between a first criterion image set on the first image and a first reference image set on the second image;
   calculate an auto-correlation value between a second criterion image and a second reference image set on either one of the first image and the second image;
   calculate a parallax amount between the first image and the second image by using the cross-correlation value and the auto-correlation value; and
   correct a fitting function by using the auto-correlation value of a formula,
   wherein the cross-correlation value is corrected using the formula depending on when a sub pixel parallax is estimated to exist on a positive side or a negative side in a parallax search direction.

6. An apparatus for calculating a parallax based on a first image and a second image, the apparatus comprising:
   one or more memories storing instructions; and
   one or more processors executing the instructions to:
   calculate a cross-correlation value between a first criterion image set on the first image and a first reference image set on the second image;
   calculate an auto-correlation value between a second criterion image and a second reference image set on either one of the first image and the second image;
   calculate a parallax amount between the first image and the second image by using the cross-correlation value and the auto-correlation value; and
   calculate the parallax amount by using the cross-correlation value and the auto-correlation value belonging to a same fitting function, by using the auto-correlation value of a formula,
   wherein the cross-correlation value is corrected using the formula depending on when a sub pixel parallax is estimated to exist on a positive side or a negative side in a parallax search direction.

7. The apparatus according to claim 6,
   wherein the auto-correlation value is calculated by moving the second reference image by at least +1 pixel or −1 pixel in an optional direction, and
   wherein the parallax amount is calculated by using a ratio of the auto-correlation value and the cross-correlation value belonging to the same fitting function, by using the auto-correlation value.

8. The apparatus according to claim 6, wherein the parallax amount is calculated based on a plurality of combinations of the auto-correlation value and the cross-correlation value belonging to the same fitting function.

9. The apparatus according to claim 8, wherein the parallax amount is an average value of a plurality of parallax amounts calculated based on a plurality of combinations of the cross-correlation value and the auto-correlation value belonging to the same fitting function.

10. The apparatus according to claim 1,
   wherein the cross-correlation value is calculated by using either one of sum of squared differences, sum of absolute differences, and normalized cross-correlation, of the first criterion image and the first reference image, and
   wherein the auto-correlation value is calculated by using either one of sum of squared differences, sum of absolute differences, and normalized cross-correlation, of the second criterion image and the second reference image.

11. The apparatus according to claim 1, wherein the one or more processors further execute the instructions to determine whether to perform correction via a parallax calculation unit, based on a reliability of the cross-correlation value or the auto-correlation value.

12. The apparatus according to claim 1, wherein the one or more processors further execute the instructions to determine whether to perform correction via a parallax calculation unit, based on a magnitude of an asymmetry of an edge texture.

13. A method for calculating a parallax based on a first image and a second image, the method comprising:
   calculating a cross-correlation value between a first criterion image set on the first image and a first reference image set on the second image;
   calculating an auto-correlation value between a second criterion image and a second reference image set on either one of the first image and the second image; and calculating a parallax amount between the first image and the second image by using the cross-correlation value and the auto-correlation value, wherein, in the calculating the parallax amount, an asymmetry of a fitting function is estimated by using the auto-correlation value to correct the cross-correlation value of a formula, wherein the cross-correlation value is corrected using the formula depending on when a sub pixel parallax is estimated to exist on a positive side or a negative side in a parallax search direction.

14. The method according to claim 13, further comprising:

changing a position of the first reference image to calculate at least two cross-correlation values; and moving the position of the second reference image by at least +1 pixel and −1 pixel in an optional direction to calculate at least two auto-correlation values, wherein the parallax amount is calculated based on a corrected cross-correlation value or the cross-correlation value, and the corrected cross-correlation value, the corrected cross-correlation value being obtained by correcting the cross-correlation value by using neighboring values of a minimum value of the auto-correlation value.

15. The method according to claim 13, wherein the cross-correlation value is calculated by using either one of sum of squared differences, sum of absolute differences, and normalized cross-correlation, of the first criterion image and the first reference image, and wherein the auto-correlation value is calculated by using either one of sum of squared differences, sum of absolute differences, and normalized cross-correlation, of the second criterion image and the second reference image.

16. The method according to claim 13, further comprising determining whether to perform correction via a parallax calculation unit, based on one of a reliability of the cross-correlation value or the auto-correlation value and a magnitude of an asymmetry of an edge texture.

17. A non-transitory computer-readable storage medium storing a program for causing an apparatus for calculating a parallax based on a first image and a second image to execute a method comprising:

calculating a cross-correlation value between a first criterion image set on the first image and a first reference image set on the second image;

calculating an auto-correlation value between a second criterion image and a second reference image set on either one of the first image and the second image; and calculating a parallax amount between the first image and the second image by using the cross-correlation value and the auto-correlation value of a formula, wherein, in the calculating the parallax amount, an asymmetry of a fitting function is estimated by using the auto-correlation value to correct the cross-correlation value, wherein the cross-correlation value is corrected using the formula depending on when a sub pixel parallax is estimated to exist on a positive side or a negative side in a parallax search direction.

18. The non-transitory computer-readable storage medium according to claim 17, further comprising:

changing a position of the first reference image to calculate at least two cross-correlation values; and moving the position of the second reference image by at least +1 pixel and −1 pixel in an optional direction to calculate at least two auto-correlation values, wherein the parallax amount is calculated based on a corrected cross-correlation value or the cross-correlation value, and the corrected cross-correlation value, the corrected cross-correlation value being obtained by correcting the cross-correlation value by using neighboring values of a minimum value of the auto-correlation value.

19. The non-transitory computer-readable storage medium according to claim 17, wherein the cross-correlation value is calculated by using either one of sum of squared differences, sum of absolute differences, and normalized cross-correlation, of the first criterion image and the first reference image, and wherein the auto-correlation value is calculated by using either one of sum of squared differences, sum of absolute differences, and normalized cross-correlation, of the second criterion image and the second reference image.

20. The non-transitory computer-readable storage medium according to claim 17, further comprising determining whether to perform correction via a parallax calculation unit, based on one of a reliability of the cross-correlation value or the auto-correlation value and a magnitude of an asymmetry of an edge texture.

\* \* \* \* \*